(12) United States Patent
Ho et al.

(10) Patent No.: US 12,431,949 B2
(45) Date of Patent: Sep. 30, 2025

(54) INTELLIGENTLY SELECTING ACTIVE TRANSCEIVER IN A MULTI-TRANSCEIVER DEVICE

(71) Applicant: Microsoft Technology Licensing, LLC, Redmond, WA (US)

(72) Inventors: Chau Van Ho, Des Moines, IA (US); Dave W. Voth, Seattle, WA (US); Kabir Siddiqui, Sammamish, WA (US); Tzong Chian Wu, New Taipei (TW)

(73) Assignee: Microsoft Technology Licensing, LLC, Redmond, WA (US)

( * ) Notice: Subject to any disclaimer, the term of this patent is extended or adjusted under 35 U.S.C. 154(b) by 335 days.

(21) Appl. No.: 17/920,900

(22) PCT Filed: May 13, 2021

(86) PCT No.: PCT/US2021/032164
§ 371 (c)(1),
(2) Date: Oct. 24, 2022

(87) PCT Pub. No.: WO2021/242529
PCT Pub. Date: Dec. 2, 2021

(65) Prior Publication Data
US 2023/0163821 A1 May 25, 2023

(30) Foreign Application Priority Data
May 25, 2020 (NL) .................... 2025659

(51) Int. Cl.
*H04B 7/06* (2006.01)
*H04B 1/40* (2015.01)
*H04B 7/0404* (2017.01)

(52) U.S. Cl.
CPC ............. *H04B 7/0604* (2013.01); *H04B 1/40* (2013.01); *H04B 7/0404* (2013.01)

(58) Field of Classification Search
CPC ...... H04B 7/0404; H04B 1/40; H04B 7/0604; H04B 7/06
See application file for complete search history.

(56) References Cited

U.S. PATENT DOCUMENTS 7,659,855 B2   2/2010   Mashima et al.
8,494,466 B2   7/2013   Jalloul et al.
(Continued)

FOREIGN PATENT DOCUMENTS

CN   208738442 U     4/2019
JP   2017195471 A   10/2017
WO   2019103527 A1   5/2019

OTHER PUBLICATIONS

Office Action Received for Chinese Application No. 202180037720.3, mailed on Oct. 24, 2024, 11 pages (English Translation Provided).
(Continued)

*Primary Examiner* — Tuan H Nguyen
(74) *Attorney, Agent, or Firm* — Novo TechIP International PLLC

(57) ABSTRACT

An electronic device may include a processor, a plurality of transceivers, and a memory in communication with the processor, the memory comprising executable instructions that, when executed by the processor, cause the electronic device to perform functions of while a first transceiver is active, identifying, from among the plurality of transceivers and based on signal quality, current temperature, and cooling capacity of each of the plurality of transceivers, a second transceiver to handover transmission of signal to from the first transceiver, and handing over transmission of the signal from the first transceiver to the identified second transceiver.

17 Claims, 7 Drawing Sheets

(56) References Cited

U.S. PATENT DOCUMENTS

| | | |
|---|---|---|
| 2014/0199952 A1 | 7/2014 | Sandhu et al. |
| 2017/0054464 A1 | 2/2017 | Peng et al. |
| 2019/0123787 A1 | 4/2019 | Seol et al. |
| 2019/0166536 A1 | 5/2019 | Kim et al. |
| 2019/0379427 A1 | 12/2019 | Geekie et al. |
| 2019/0392694 A1* | 12/2019 | Funaki ................. H04B 7/0874 |

OTHER PUBLICATIONS

"Notice of Allowance Issued in Netherlands Patent Application No. N2025659", Mailed Date: Dec. 13, 2021, 5 Pages.
"Search Report and Written Opinion Issued In Netherlands Application No. N2025659", Mailed Date: Mar. 11, 2021, 11 Pages.
Natarajan, et al., "Multi-antenna Switch Control in 5G", In Technical Disclosure Commons, Aug. 29, 2019, pp. 1-9.
"International Search Report and Written Opinion Issued in PCT Application No. PCT/US21/032164", Mailed Date: Jun. 17, 2021, 11 Pages.
Communication under Rule 71(3) EPC Received for European Application No. 21727982.7, mailed on Feb. 24, 2025, 9 pages.
Second Office Action Received for Chinese Application No. 202180037720.3, mailed on Apr. 1, 2025, 07 pages. (English Translation Provided).
Decision to grant a European patent pursuant to Article 97(1) EPC Received for European Application No. 21727982.7, mailed on Jul. 3, 2025, 02 pages.
Notice of Allowance Received for Chinese Application No. 202180037720.3, mailed on Jul. 15, 2025, 05 pages. (English Translation Provided).

* cited by examiner

INTELLIGENTLY SELECTING ACTIVE TRANSCEIVER IN A MULTI-TRANSCEIVER DEVICE

TECHNICAL FIELD

This disclosure relates generally to selection of an active antenna module in a device having multiple antenna modules and, more particularly, to a system and method of selecting the active antenna module based on at least one of signal quality, temperature, and cooling capacity of the multiple antenna modules

BACKGROUND

In recent years, many electronic devices have begun supporting high-speed communication mechanisms such as millimeter wave (mmWave) frequency bands or the 5G technology standard. Because of the high-speed communication capabilities, these devices are often able to transmit large amounts of data in a short period of time. This large-scale transmission of data may lead to the overheating of an active transceiver in the electronic device. This may in turn cause other components in the electronic device to overheat.

To avoid overheating and/or provide high quality communications, some electronic devices include multiple transceivers (e.g., antenna modules). In such devices, one transceiver is often active at a given time. Once the active transceiver begins overheating and/or the signal quality decreases below a threshold, the device handovers signal transmission to another transceiver. However, each time transmission is handed over because of overheating, there may be a lag in signal transmission. This is inconvenient for users and may lead to user frustration and dissatisfaction with the device.

SUMMARY

Apparatuses and methods of a for handing over transmission of a signal from a first transceiver to a second transceiver are described. In one general aspect, the instant disclosure presents an electronic device which includes a processor, a plurality of transceivers, and a memory in communication with the processor. The memory may include executable instructions that, when executed by the processor, cause the electronic device to: while a first transceiver is active, identify, from among the plurality of transceivers and based on signal quality, current temperature, and cooling capacity of each of the plurality of transceivers, a second transceiver to handover transmission of signal to from the first transceiver, and hand over transmission of the signal from the first transceiver to the identified second transceiver.

In another general aspect, the instant application describes a method for handing over transmission of a signal from a first transceiver to a second transceiver. The method may include while a first transceiver is active, identifying, from among the plurality of transceivers and based on signal quality, current temperature, and cooling capacity of each of the plurality of transceivers, a second transceiver to handover transmission of signal to from the first transceiver, and handing over transmission of the signal from the first transceiver to the identified second transceiver.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

DETAILED DESCRIPTION

Figure 1A:
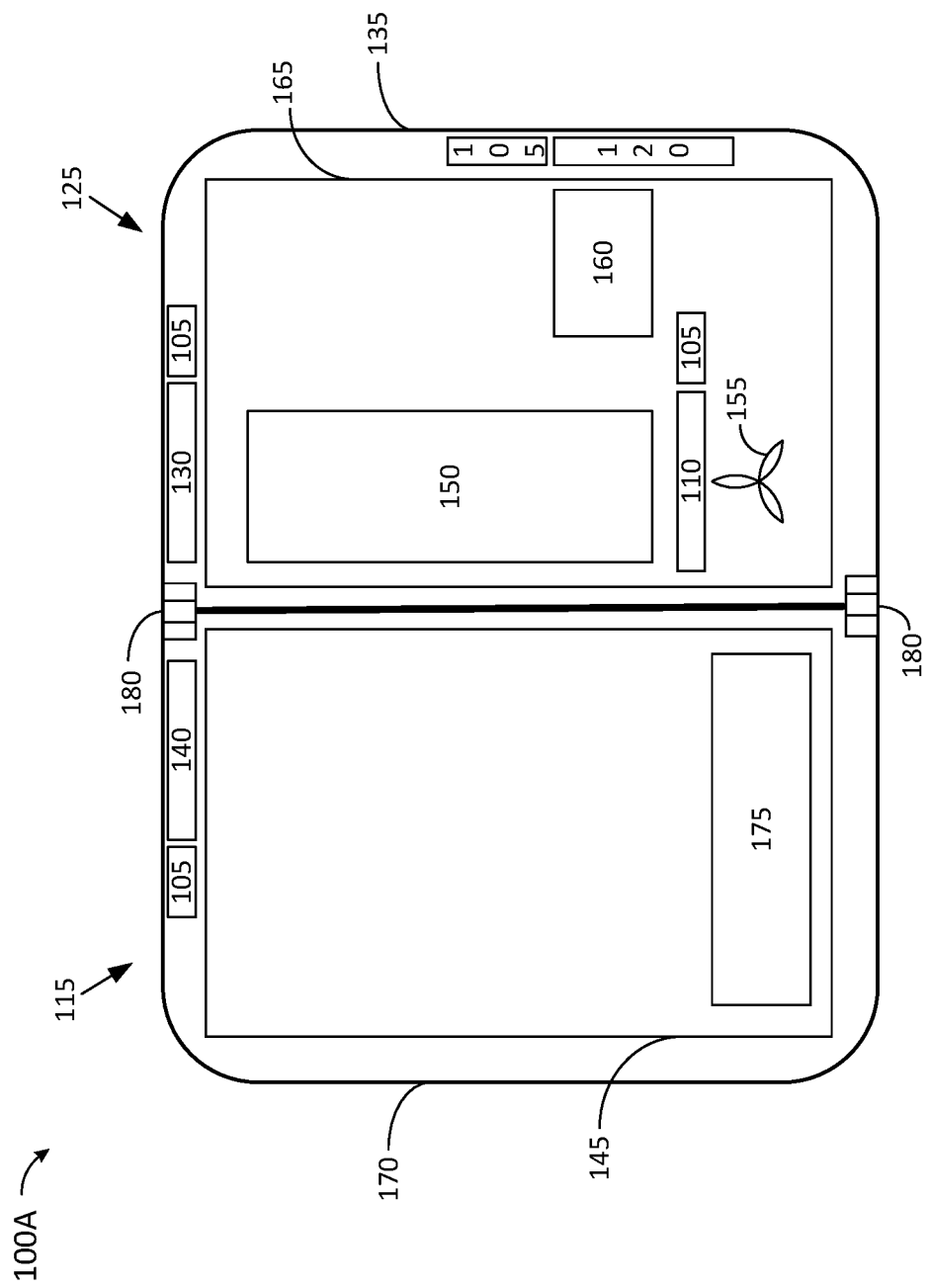
FIG. 1A depicts a top-view schematic representation of an electronic device upon which aspects of this disclosure may be implemented.

In the following detailed description, numerous specific details are set forth by way of examples in order to provide a thorough understanding of the relevant teachings. It will be apparent to persons of ordinary skill, upon reading this description, that various aspects can be practiced without such details. In other instances, well known methods, procedures, components, and/or circuitry have been described at a relatively high-level, without detail, in order to avoid unnecessarily obscuring aspects of the present teachings Many of today's electronic devices support high-speed communication mechanisms. When these high-speed communication tools are used, the devices can often send and/or receive large amounts of data within short periods of time. This can lead to overheating of the active transceiver involved in the data transfer which can in turn result in overheating of other components in the device. Because many devices that offer communication capabilities include multiple transceivers, to prevent overheating, a device often hands over signal transmission from the active transceiver (e.g., the overheating transceiver) to another transceiver in the device. To determine which transceiver to handover the signal to, signal quality and/or temperature of the remaining transceivers in the device may be analyzed. The transceiver that provides the best signal quality and/or has the lowest current temperature may be selected for handover. The current temperature, however, may not be an accurate indicator of which transceiver will overheat next. That is because in addition to the current temperature, there are other factors that may affect the thermal behavior of transceivers. As a result, selecting the transceiver based on the current temperature and/or signal quality may lead to a swift overheating of the selected transceiver and thus lead to another handover soon after the first one. In many devices, there is a time delay between when the active transceiver overheats and the time the next transceiver begins transmission. This time delay may result in disruption of the task being performed on the device. The more the device needs to handover transmission, the more this time delay may occur. Thus, inaccurate identification of the transceiver to which signal transmission is transferred may lead to frequent disruptions in activities performed on the device. This leads to inefficiencies for the system as well as user inconvenience and dissatisfaction.

To address these technical problems and more, a technical solution is provided that includes identifying from among a plurality of transceivers in a device and based on signal quality, current temperature, and cooling capacity of each of the plurality of transceivers, a next active transceiver to handover transmission of signal to from an active transceiver. The cooling capacity may depend on each transceiver's position within the device and/or whether external cooling modules (e.g. fans) are available to the transceiver. Additionally, the technical solution may intelligently determine the amount of time it may take the active transceiver to reach a threshold temperature (e.g., an overheating temperature), intelligently identify the transceiver to handover transmission of signal to from the active transceiver and preemptively handover the transmission before the active transceiver reaches the threshold temperature. This may reduce and/or eliminate the time delay between signal handovers as a result of overheating. Moreover, because handover may be performed before reaching the threshold temperature, it may prevent device components from overheating. This can increase device life expectancy and improve user experience.

As will be understood by persons of skill in the art upon reading this disclosure, benefits and advantages provided by such implementations can include, but are not limited to, a solution to the technical problem of accurately identifying the transceiver that provides top thermal capacity (e.g., is likely to remain active the longest before overheating) from among the transceivers in the device and to reduce the need for frequent handover and/or time delay between handovers as a result of overheating. Thus, the technical solution increases device performance and device life expectancy and improves user experience.

Referring now to the drawings, FIG. 1A depicts a top-view schematic representation of an electronic device 100A upon which aspects of this disclosure may be implemented. In some implementations, the electronic device is a foldable device having multiple modes of operations. Examples of suitable electronic devices include but are not limited to dual-screen laptops, dual-screen mobile phones, single-screen laptops, foldable tablets, and other foldable mobile phones. In the example of FIG. 1A, device 100A is a dual-screen mobile phone having a right portion 125 that is movably connected to a left portion 115.

The right portion 125 may include an external casing 135 and a display screen 165. The external casing 135 may provide an internal housing for the display screen 165 as well as for various additional components that may be included in the right portion 125 of the device 100A. In an example, some components such as a system-on-a-chip (SoC) 150, a memory 160, a transceiver 110 and a cooling module 155 are positioned behind the display screen 165. Other components such as a transceiver 120 and a transceiver 130 may be positioned on the periphery of the display screen 165. The transceivers 120 and 130 may be located closer to the outer edges of the external casing 135 to provide better signal quality.

The left portion 115 may include an external casing 170 and a display screen 145. The external casing 170 may provide an internal housing for the display screen 145, for an additional transceiver 140 and for various additional components such as a battery 175 (which may be located behind the display screen 145). Thus, the electronic device 100A may include transceivers 110, 120, 130 and 140 located at various positions within the electronic device to provide multiple alternate communication modules. This may provide continuous connectivity even when one or more of the transceivers are blocked due to device posture, device location and/or other reasons. In some implementations, each of the transceivers 110, 120, 130 and 140 have a corresponding temperature sensor 105 for measuring the transceiver's current temperature.

The different locations of each of the transceivers 110, 120, 130 and 140 may result in each transceiver having different thermal behaviors and/or cooling capacities. This is because each transceiver may be adjacent to different types of components and those components may themselves have a variety of thermal behaviors. For example, the transceiver 110 is located adjacent to the SoC 150 which may generate its own heat. However, the transceiver 110's location is also adjacent to the cooling module 155. The cooling module 155 may be a fan or any other element that can reduce the temperature of an electronic component. In some implementations, the cooling module 155 may provide substantial cooling capability, thus counteracting any heat generated by the SoC 150. Each of the transceivers 130 and 140 may be less susceptible to heating as they are not immediately adjacent to any heat-generating components of the electronic device 100A. Moreover, the transceivers 130 and 140 are positioned closer to the edge of the external casings 135 and 170 which may enable them to dissipate some heat to the ambient environment. The transceiver 120, on the other hand, is close to the memory 160 which may also generate heat. Furthermore, the location of the transceiver 120 does not provide any space for offering a cooling module. Additionally, the transceiver 120 is located at a position within the device that is close to where the user is likely to be holding the device. The user's finger(s) near the transceiver 120 may generate additional heat. Furthermore, the presence of the user's finger(s) and/or palm may prevent heat from dissipating from the transceiver 120 and/or block the transceiver 120, which reduces transmitting signal. Thus, each of the transceivers 110, 120, 130 and 140 may exhibit different thermal behaviors and have different cooling capacities. It should be noted that the locations shown for each of the transceivers 110, 120, 130 and 140 are examples. In different configurations, each of the transceivers 110, 120, 130 and 140 may be placed anywhere within the housing provided by the external casings 135 and 170.

The right portion 125 may be movably connected to the left portion 115 via two connecting elements 180. In an example, the connecting elements 180 include one or more hinges. The connecting elements 180 may enable the right portion 125 to pivot with respect to the left portion 115 to provide multiple modes of operation. In some implementations, the connecting elements 180 include a 360° rotating hinge that enables each of the right and left portions 125 and 115 to rotate up to 360° to provide multiple modes. These modes may include, a horizontal dual-screen mode, a vertical dual-screen mode (e.g., the left portion 115 being positioned at a 90° angle with respect to the right portion 125 or vice versa), a single-screen mode (e.g., the left portion 115 is folded behind the right portion 125 or vice versa) and a closed mode (e.g., the left portion 115 is folded on top of the right portion 125 or vice versa). It should be noted that although the left portion 115 and the right portion 125 are referred to as left and right portions, other configurations are also contemplated. For example, the left and right portions may be arranged such that they function as top and bottom portions.

Because of the various modes of operations offered, each of the transceivers 110, 120, 130 and 140 may be blocked from or may have difficulty sending and/or receiving a communication signal from a base station with which the electronic device 100A communicates. For example, in the single-screen mode if the transceiver 110 was being utilized as the active transceiver, because the back of the right portion 125 is blocked by the left portion 115, the transceiver 110 may begin to have difficulty communicating with the base station. In another example, when the transceiver 120 is the active transceiver, the user may position his/her finger adjacent to the transceiver 120 (e.g., while holding the device in the horizontal dual-screen mode). As a result, the transceiver 120 may be blocked from or may have difficulty communicating with the base station. In such circumstances, to handover the signal, the electronic device 100A may need to identify one or more alternative transceivers from among the non-active transceivers.

The need to handover transmission to a different transceiver may also arise when the active transceiver reaches a threshold temperature. The threshold temperature may be a temperature above which damage to the transceiver and/or other components of the device may occur and/or which may result in hot spots on the electronic device. A hot-spot may be a portion of the external casing that becomes hot enough to cause discomfort and/or a low-grade burn to the user's hand or fingers. In an example, the threshold temperature is 48 degrees Celsius. In another example, the threshold temperature is 43 degrees Celsius. To prevent damage to the device and/or injury to the user, the electronic device 100A may identify one or more alternative transceivers from among the non-active transceivers to handover the signal to. This may occur at or before the active transceiver reaches the threshold temperature.

When there is a need to identify an alternative transceiver, the electronic device 100A may analyze the non-active transceivers to determine which one(s) provide good signal quality. Moreover, because each of the transceivers 110, 120, 130 and 140 have different thermal behaviors and conditions, the current temperature and/or the cooling capacity of each non-active transceiver may also be analyzed to identify transceiver(s) that are less likely to reach the threshold temperature within a short period of time. Such a transceiver is referred to herein as the next active transceiver. In some implementations, the cooling capacity of one or more of the transceivers may depend on the device posture (e.g., the mode of operation the device 100A is in and/or the manner in which the user is holding the device 100A). For example, a transceiver's cooling capacity may be a first value when a device is operating in a closed orientation and a second value when the device is operating in an open orientation. As another example, the transceiver's cooling capacity may be a first value when the device is operated in a horizontal orientation and may be a second value when the device is operated in a vertical orientation. In some implementations, the cooling capacity values of each transceiver are stored in a look-up table that can be accessed to identify the cooling capacity of the transceiver for a particular orientation and/or operational mode. When two or more transceivers provide similar signal qualities, the transceiver which is likely to take the longest amount of time to reach the threshold temperature may be selected. In this manner not only the current temperature and signal quality of the transceivers, but also conditions that may affect transceiver thermal behavior and/or cooling capacity may be taken into account to provide a more accurate identification of the next active transceiver.

Figure 1B:
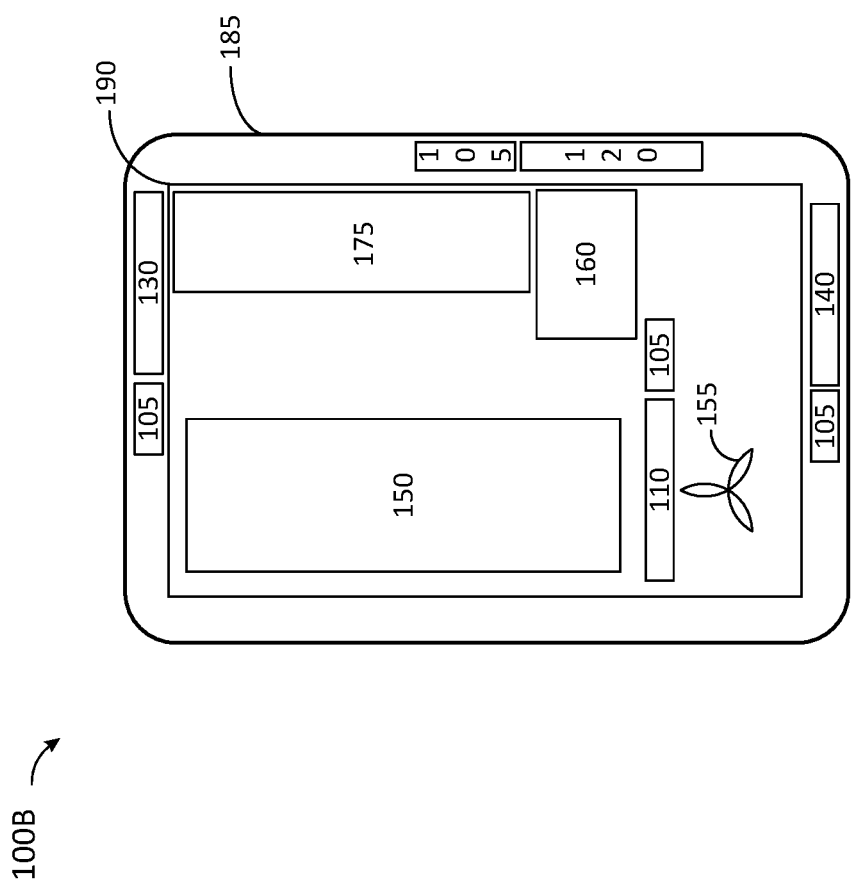
FIG. 1B depicts a top-view schematic representation of an alternative electronic device upon which aspects of this disclosure may be implemented.

FIG. 1B depicts a top-view schematic representation of an alternative electronic device upon which aspects of this disclosure may be implemented. In some implementations, the electronic device is a non-foldable device. Examples of suitable electronic devices include but are not limited to single-screen mobile phones, single-screen tablets, and single-screen electronic wearables (e.g., smart-watches and the like). In the example of FIG. 1B, device 100B is a single-screen mobile phone having an external casing 185.

The external casing 185 may provide an internal housing for a display screen 190 as well as for various additional components that may need to be included in the electronic device 100B. In an example, some components such as the system-on-a-chip (SoC) 150, transceiver 110, memory 160, battery 175 and the cooling module 155 may be positioned behind the display screen 190. Other components such as the transceivers 120, 130 and 140 may be positioned on the periphery of the external casing 185. The transceivers 120, 130 and 140 may be positioned closer to the outer edges of the external casing 185 to provide better signal quality. In some implementations, each of the transceivers 110, 120, 130 and 140 have a corresponding temperature sensor 105 for measuring the transceiver's current temperature. In some implementations, a transceiver's current temperature is determined/estimated based on data from one or more temperature sensors. For example, a transceiver's current temperature may be estimated via a weighted average of temperature readings from two or more temperature sensors. Because the electronic device 100B is a non-foldable device, all components may need be positioned within the external casing 185. This may result in a thicker external casing 185 (as compared to the external casings 135 and 170) which may affect the thermal behavior of the transceivers 110, 120, 130 and 140. For example, the thicker casing 185 may allow for vacant space near one or more of the transceivers 110, 120, 130 and 140, thereby enabling more heat dissipation. Such vacant space may be taken into account when analyzing the transceivers' cooling capacity.

As discussed above with respect to FIG. 1A, the different locations of each of the transceivers 110, 120, 130 and 140 within the electronic device 100B may result in each transceiver having different thermal behaviors and/or cooling capacities. This is because each of the transceivers 110, 120, 130 and 140 are located adjacent to different types of components and those components may have different thermal behaviors. For example, the transceiver 110 is located adjacent to the cooling module 155 which may actively decrease the transceiver 110's temperature. The transceivers 120, 130 and 140, on the other hand, are positioned closer to the edge of the external casing which may allow them to dissipate some heat to the ambient environment. However, the transceiver 120 is located at a position within the device that is close to where the user is likely to be holding the device. As discussed above, the user's finger(s) near the transceiver 120 may generate additional heat and/or may prevent heat from dissipating from the transceiver 120.

Thus, each of the transceivers 110, 120, 130 and 140 may exhibit different thermal behaviors and have different cooling capacities. It should be noted that the locations shown for each of the transceivers 110, 120, 130 and 140 are example locations. In different configurations each of the transceivers 110, 120, 130 and 140 may be placed anywhere within the housing provided by the external casing 185.

When the active transceiver in the electronic device 100B is blocked (e.g., due to the user's hand or another object blocking the signal) and/or the active transceiver has reached the threshold temperature, one or more algorithms may be utilized to identify the next active transceiver from among the non-active transceivers of the electronic device 100B, as discussed further below. As discussed above with respect to FIG. 1A, this may be achieved by analyzing the signal quality as well as the current temperature and/or cooling capacity of each of the remaining transceivers to identify a transceiver that provides acceptable signal quality while also providing a longer use capacity before reaching the threshold temperature. In some implementations, identifying the next transceiver to be utilized includes determining a time period, after being activated, for the next transceiver to reach a corresponding threshold temperature. In some implementations, the time period is determined based on one or more of: a current temperature of the next transceiver, a cooling capacity of the next transceiver, a device posture, an operational state of the device, and the like. The algorithms used to identify the next transceiver may include calculating a weighted average of signal quality and the time period for each transceiver, and then selecting the transceiver that provides the best weighted average as the next transceiver.

The process of analyzing the non-active transceivers to identify the next active transceiver and then handing over the signal to that transceiver may require some time. If the active transceiver has already reached the threshold temperature, the device may need to throttle the signal to prevent overheating. When this occurs during an active communication session (e.g., during a video call), the amount of time needed to identify the next active transceiver and hand over the signal may lead to disruptions in the session.

In some implementations, to avoid such disruptions, the amount of time needed for the active transceiver to reach the threshold temperature may be predetermined. In some implementations, this is achieved by utilizing one or more machine learning (ML) models and depends on a variety of factors such as the amount of power being used by the active transceiver, the task being performed by the electronic device 100B, the cooling capacity of the active transceiver and/or the current temperature of the active transceiver, as described below with respect to FIG. 2. Similarly, the next active transceiver may be identified by utilizing one or more ML models and analyzing multiple factors, as described below with respect to FIG. 2. Once the amount of time is determined and the next active transceiver is identified, the signal may be handed over to the next active transceiver before the amount of time is reached.

As a general matter, the methods and systems described herein may include, or otherwise make use of, a machine-trained model to identify the next active transceiver and determine the amount of time it may take the active transceiver to reach the threshold temperature. ML generally includes various algorithms that a computer automatically builds and improves over time. The foundation of these algorithms is generally built on mathematics and statistics that can be employed to predict events, classify entities, diagnose problems, and model function approximations. As an example, a system can be trained using data generated by an ML model in order to identify patterns in user activity, determine associations between activities performed on a device and the temperature of the active transceiver, and determine associations between device posture and thermal behavior of transceivers. Such training may be made following the accumulation, review, and/or analysis of data from a large number of devices over time, and which is configured to provide the ML algorithm (MLA) with an initial or ongoing training set. In addition, in some implementations, a device can be configured to transmit data captured locally during use of relevant application(s) to a local or remote ML program and provide supplemental training data that can serve to fine-tune or increase the effectiveness of the MLA.

In different implementations, a training system may be used that includes an initial ML model (which may be referred to as an "ML model trainer") configured to generate a subsequent trained ML model from training data obtained from a training data repository or from device-generated data. The generation of both the initial and subsequent trained ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms, such as, but not limited to, decision trees, random decision forests, neural networks, deep learning (for example, convolutional neural networks), support vector machines, regression (for example, support vector regression, Bayesian linear regression, or Gaussian process regression) may be trained. As another example, size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

The training data may be continually updated, and one or more of the ML models used by the system can be revised or regenerated to reflect the updates to the training data. Over time, the training system (whether stored remotely, locally, or both) can be configured to receive and accumulate more training data items, thereby increasing the amount and variety of training data available for ML model training, resulting in increased accuracy, effectiveness, and robustness of trained ML models.

Figure 2:
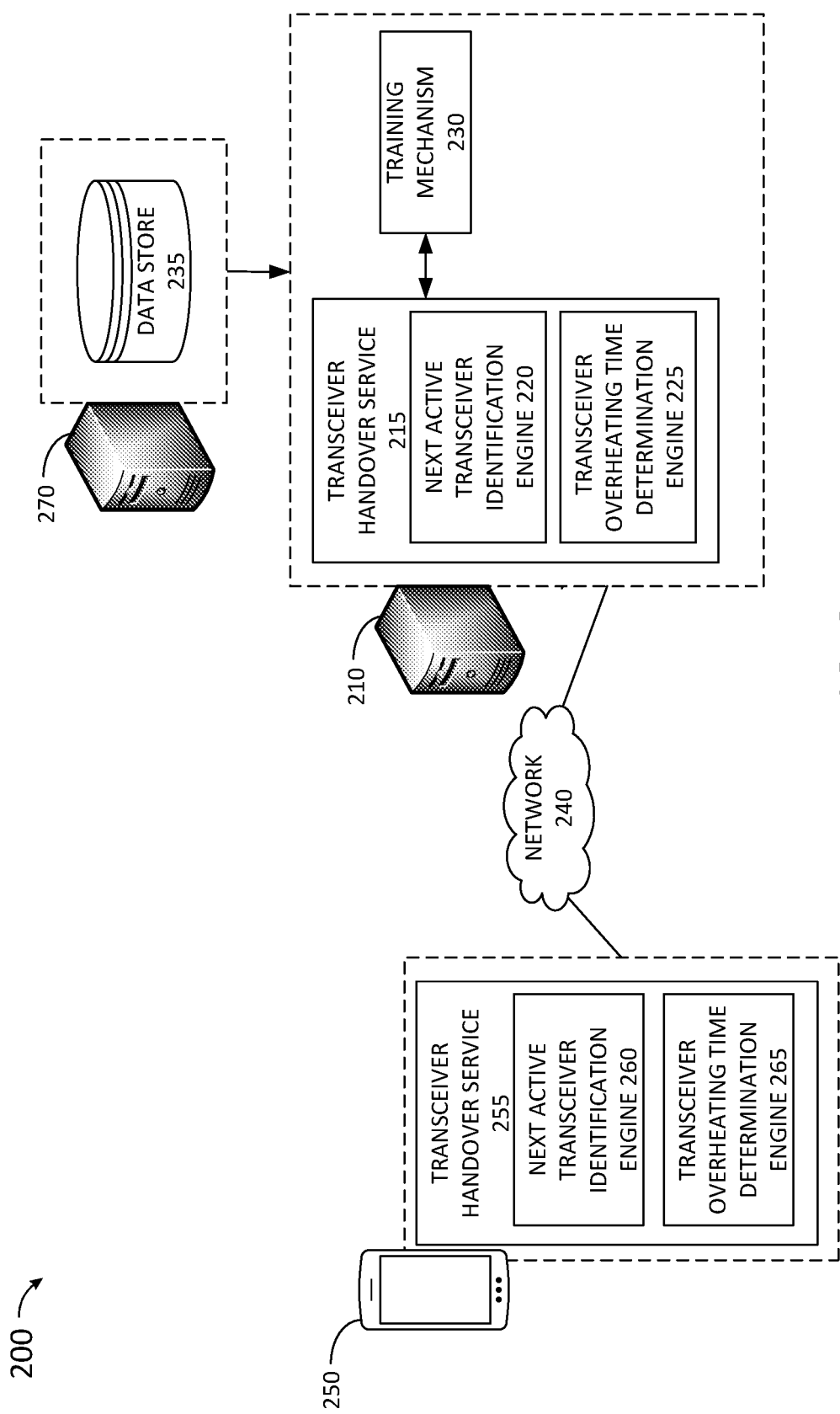
FIG. 2 depicts an example system upon which aspects of this disclosure may be implemented.

FIG. 2 illustrates an example system 200, upon which aspects of this disclosure may be implemented. The system 200 may include a sever 210 which may contain and/or execute a transceiver handover service 215. The server 210 may operate as a shared resource server located at an enterprise accessible by various computer devices such as the device 250 (or electronic devices 100A and 100B of FIGS. 1A-1B). The server 210 may also operate as a cloud-based server for offering transceiver handover services to multiple electronic devices. Although shown as one server, the server 210 may represent multiple servers for performing various different operations. For example, the server 210 may include one or more processing servers for performing the operations of a next active transceiver identification engine 220 and a transceiver overheating time determination engine 225.

The transceiver handover service 215 may include the next active transceiver identification engine 220 and transceiver overheating time determination engine 225 for providing transceiver handover assistance. The transceiver overheating time determination engine 225 may provide intelligent determination of the amount of time remaining until an active transceiver in a device such as device 250 reaches the threshold temperature. This may be initiated by receiving a request for transceiver handover service from the device 250. In some implementations, the request may be automatically transmitted from the device 250 when certain conditions are met. For example, the request may be automatically submitted when the current temperature of the active transceiver passes a first threshold (e.g. 30° C.). In other examples, the request may be submitted when the amount of power used by the active transceiver exceeds a predetermined amount. The request may include information about the active transceiver, such as data relating to the active transceiver's current temperature, the active transceiver's location within the device, the active transceiver's cooling capacity, the device posture, and/or current power consumption. Additionally, the request may include information about the task(s) being currently performed on the device.

Once the request is received, the transceiver overheating time determination engine 225 may calculate an estimated amount of time it will take the active transceiver to reach the threshold temperature based on the data provided. In some implementations, this may be performed by one or more ML models. For example, the transceiver overheating time determination engine 225 may calculate the amount of power likely consumed for the active transceiver to perform the current communication tasks and then estimate the amount of heat generated by the power within a given time period. Additionally and/or alternatively, the transceiver overheating time determination engine 225 may determine, based on user history and/or current activates performed on the device 250, future activities that are likely to be performed by the user and then analyze their effects on the transceiver. Additionally, the transceiver overheating time determination engine 225 may analyze the device posture to determine the heat dissipation capacity of the active transceiver. This information in addition to the location of the active transceiver within the device and/or any cooling modules provided for the active transceiver may provide an understanding of the cooling capacity of the active transceiver. The cooling capacity may offset some of the heat expected to be generated by the active transceiver. Analyzing the current temperature of the active transceiver and the amount of power consumed by the active transceiver may provide an estimated rate of temperature increase overtime. The estimated temperature increase may be adjusted based on the cooling capacity to determine the amount of time required until the active transceiver is likely to reach the threshold temperature. The determined amount may be transmitted to the device 250.

The next active transceiver identification engine 220 may provide intelligent identification of the next active transceiver. This may be initiated by receiving a request from the device 250. This request may include information about each of the non-active transceivers. The information may include each transceiver's current temperature, each transceiver's location within the device, each transceiver's cooling capacity, and each transceiver's signal quality. Furthermore, the information may include data about the device posture, the task(s) being currently performed on the device, the tasks likely to be performed in the future, and the power being consumed by the active transceiver.

Once the request and the required data is received, the next active transceiver identification engine 220 may identify the next active transceiver by analyzing each of the non-active transceivers and determining which one provides a combination of better signal quality and thermal endurance. In some implementations, this may be performed by one or more ML models. For example, the next active transceiver identification engine 220 may determine the amount of power consumed to provide communication for the activities currently performed and estimate the amount of heat generated by such activities within a given time period (e.g., the amount of heat generated by each transceiver if they are to begin signal transmission for the current activities). Additionally and/or alternatively, the next active transceiver identification engine 220 may determine, based on user history and/or current activities performed on the device 250, future activities that are likely to be performed by the user and analyze their potential effects on each of the non-active transceivers. Furthermore, the next active transceiver identification engine 220 may analyze the device posture to determine the heat dissipation capacity of the each of the non-active transceivers based on the device posture. This may include calculating a thermal time constant for each non-active transceiver. This information in addition to the location of each non-active transceiver within the device and/or any cooling modules provided for each non-active transceiver may provide an understanding of the cooling capacity of each non-active transceiver. By analyzing the current temperature of each non-active transceiver and the amount of power consumed by the active transceiver, the next active transceiver identification engine 220 may determine an estimated temperature increase overtime for each non-active transceiver. The estimated temperature increase may be adjusted based on the cooling capacity of each non-active transceiver to determine the time period it takes, after being activated, for each transceiver to reach the threshold temperature. The next active transceiver may then be selected by choosing the transceiver that provides a good signal quality and a shorter time period. In some implementations, the next active transceiver is selected based on a weighted average of the signal quality and the time period for each transceiver.

In some implementations, instead of measuring the current temperature of each transceiver, the current temperature may be estimated. This may be achieved by determining the current temperature of the ambient environment and/or other component(s) within the device and estimating the current temperature of each transceiver based on the location of the transceivers, their cooling capacity, device posture, the power being consumed by the device, and the like. This may be achieved by utilizing one or more ML models that receive the location of the transceivers, their cooling capacity, the power being consumed by the device, and the current ambient temperature and provided the estimated transceiver temperatures as an output.

The server 210 may be connected to or include a storage server 270 containing a data store 235. The data store 235 may function as a repository in which data sets (e.g., training data sets) may be stored. One or more ML models used by the next active transceiver identification engine 220 and transceiver overheating time determination engine 225 may be trained by a training mechanism 230. The training mechanism 230 may use training data sets stored in the data store 235 to provide initial and ongoing training for each of the models. In one implementation, the training mechanism 230 may use labeled training data from the data store 235 to train each of the models via deep neural network(s) and/or other types of ML algorithms. The initial training may be performed in an offline stage. Additionally and/or alternatively, the one or more ML models may be trained using batch learning.

The device 250 may be connected to the server 210 via a network 240. The network 240 may be a wired or wireless network(s) or a combination of wired and wireless networks that connect one or more elements of the system 200. The device 250 may be a personal or handheld computing device having multiple transceivers that enable the device 250 to provide communicate mechanisms. The internal hardware structure of a device such as device 250 is discussed in greater detail in regard to FIGS. 5 and 6.

In some implementations, the device 250 also includes a transceiver handover service 255. The transceiver handover service 255 may include a next active transceiver identification engine 260 and a transceiver overheating time determination engine 265. In an example, the local next active transceiver identification engine 260 may function similarly to the next active transceiver identification engine 220 to provide local identification of the next active transceiver. Similarly, the local transceiver overheating time determination engine 265, may function in a similar manner as the transceiver overheating time determination engine 225 to provide local estimation of the active transceiver overheating time.

It should be noted that each of the next active transceiver identification engine 220, transceiver overheating time determination engine 225, next active transceiver identification engine 260 and transceiver overheating time determination engine 265 may be implemented as software, hardware, or combinations thereof. It should also be noted that the ML model(s) estimating transceiver temperature(s), estimating the active transceiver overheating time and/or identifying the next active transceiver may be hosted locally on the device 250 or remotely, e.g., in the cloud. In one implementation, some ML models are hosted locally, while others are stored remotely. This may enable the device 250 to provide transceiver handover service even when the client is not connected to a network.

Figure 3:
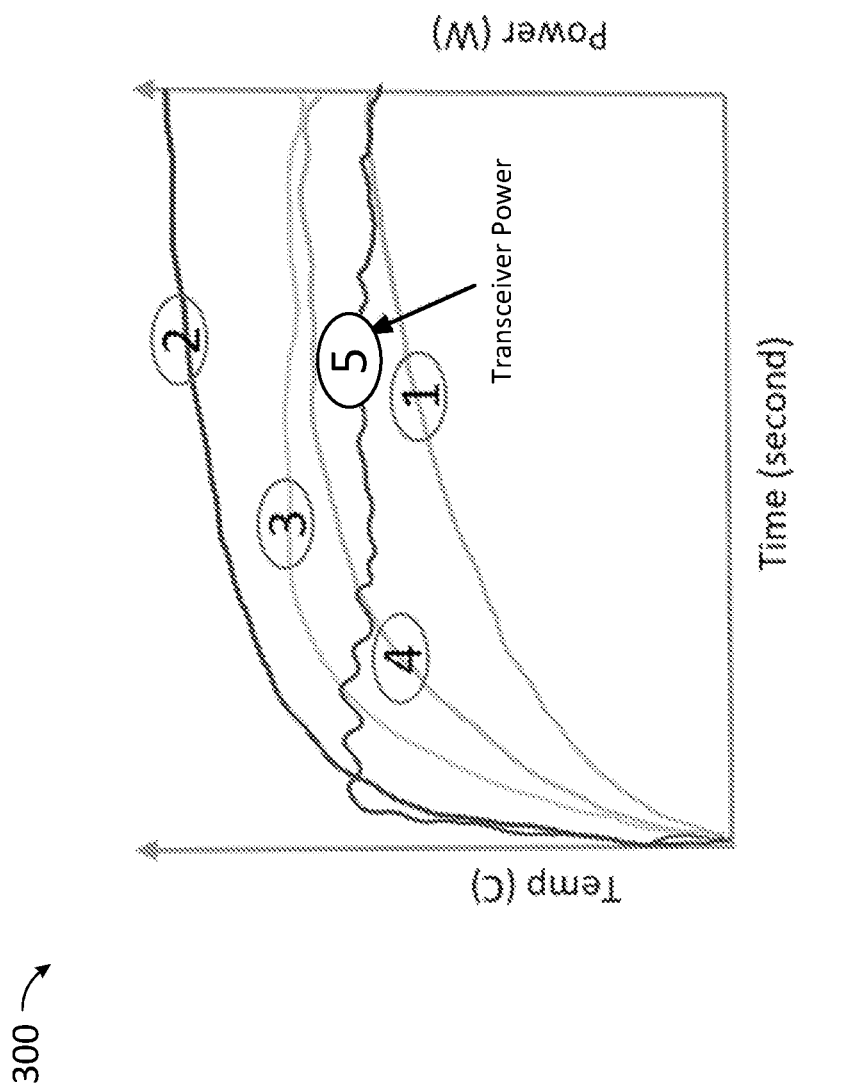
FIG. 3 depicts a diagram of variations in the temperature of a plurality of transceivers in an electronic device.

FIG. 3 depicts a diagram of variations in temperature of various active transceivers in an electronic device such as the electronic device 100A of FIG. 1 based on time and how the temperature corresponds with transceiver power. The graph 300 of FIG. 3 includes four lines 1-4 representing temperature curves for four different transceivers, while a line 5 illustrates changes in transceiver power during the same time period. In an example, line 1 corresponds to a temperature curve for the transceiver 110 of FIG. 1A, while each of the lines 2-4 correspond to temperature curves for the transceiver 120, 130 and 140 of FIG. 1A, respectively. As depicted by the 4 different temperature curves and the transceiver power curve, each of the transceivers may have a different rate of temperature increase when the transceiver power remains relatively unchanged. For example, line 1 illustrates that transceiver 110 which includes a cooling module has the slowest rate of temperature increase. Conversely, line 2 which depicts the temperature curve of the transceiver 120 illustrates that the transceiver 120 module has the fastest rate of temperature increase. As discussed above with respect to FIG. 1A, this may be because transceiver 120 has the lowest cooling capacity. Lines 3 and 4 illustrate that transceivers 130 and 140 have similar rates of temperature increase and those rates fall in between the rate for transceiver 110 and the rate for transceiver 120. That may be because transceivers 130 and 140 are located in similar positions within the electronic device and as such have similar cooling capacities. Thus, the graph 300 illustrates that each transceiver's cooling capacity can vary, and that cooling capacity can have a significant impact on an active transceiver's effectiveness.

Figure 4:
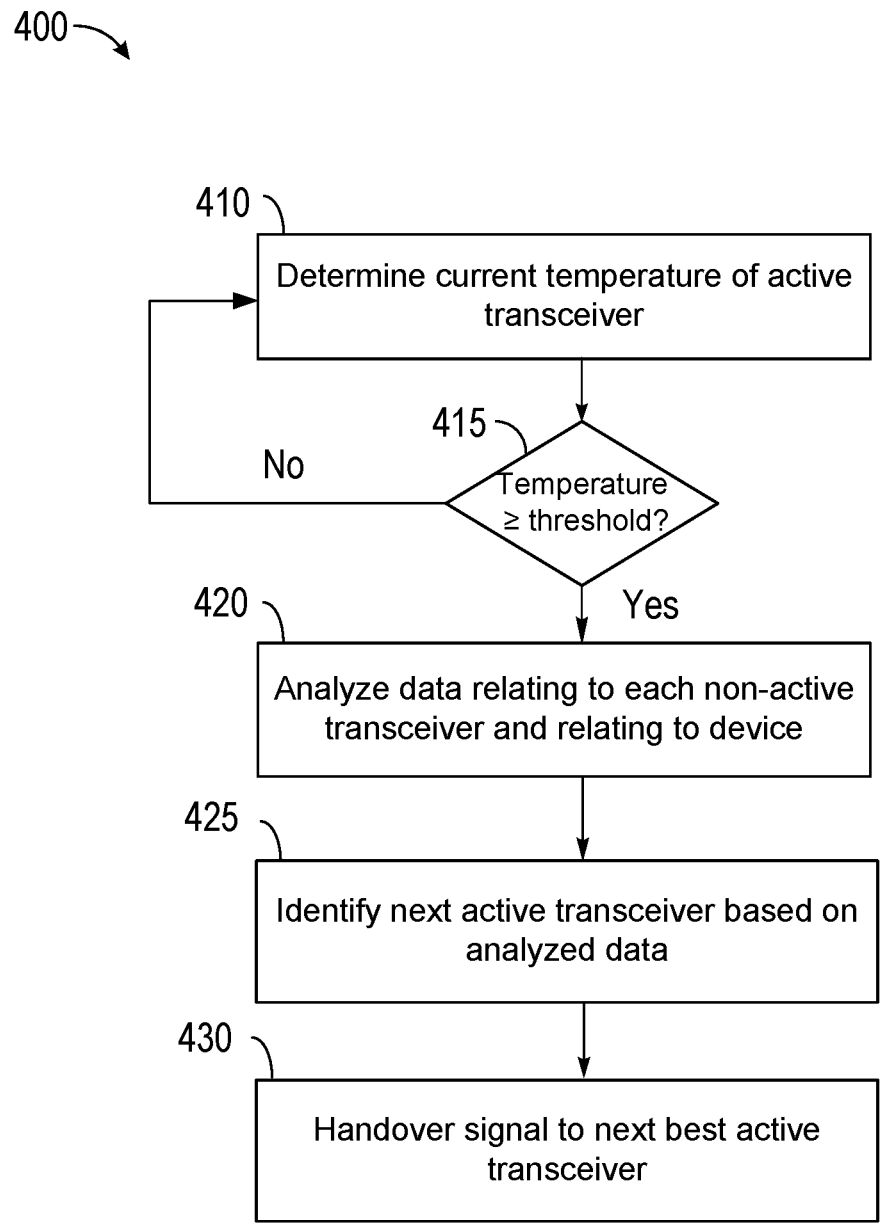
FIG. 4 is a flow diagram for a method for handing over transmission of a signal from an active transceiver to another transceiver of an electronic device.

FIG. 4 is a flow diagram depicting an example method 400 for handing over transmission of a signal from an active transceiver to a next active transceiver in an electronic device. In some implementations, the method 400 is performed by a transceiver handover service such as service 215 or 255 of FIG. 2. At 410, the method 400 may begin by determining the current temperature of the active transceiver. This may be achieved by receiving a temperature reading from a temperature sensor associated with the active transceiver. In alternative implementations, this may be achieved by receiving a current temperature of the ambient environment and/or other components of the electronic device, along with data relating to the active transceiver (e.g., current activity, transceiver power, device posture, and/or cooling capacity) and estimating the current temperature based on the data.

Once the current temperature of the active temperature has been determined, method 400 may proceed to determine whether the current temperature is equal to or exceeds the threshold temperature, at 415. In some implementations, the threshold temperature may be different for different device and/or for different transceivers within the device. In such instances, the threshold temperature may also be provided as a data point. When it is determined that the temperature is not equal to and does not exceed the threshold temperature (415, No), method 400 may return to step 410 to determine the current temperature. This may continue until the current temperature is equal to or exceeds the threshold temperature. In some implementations, instead of waiting for the current temperature to reach the threshold temperature, method 400 calculates the amount of time required for the active transceiver to reach the threshold temperature. This may be done as discussed above with respect to FIG. 2. Once the amount of time is calculated, method 400 may proceed to steps 420, 425 and 430 as discussed below. However, when the amount of time is calculated, the handover may occur preemptively before the active transceiver reaches the threshold temperature.

When it is determined, at 415, that the current temperature of the active transceiver is equal to or exceeds the threshold temperature (415, Yes), method 400 may proceed to analyze data relating to each non-active transceiver and relating to the device, at 420. This may include analyzing data relating to each non-active transceiver's current temperature, signal quality, power consumption and/or cooling capacity. The analysis may also include analyzing the device posture, activities being currently performed on the device, activities that are likely to be performed on the device in the future (e.g., near future), and the ambient temperature. Once all the required data has been analyzed and taken into account, method 400 may proceed to identify the next active transceiver from among the non-active transceivers based on the analyzed data, at 425. When the next active transceiver is identified, the signal may be handed over to the next active transceiver, at 430. In this manner, the next active transceiver may be identified not only based on current temperature and/or signal quality, but also based on additional factors such as cooling capacity which may determine the length of time it will take the next active transceiver to reach the threshold temperature. This may lead to less overheating and as such less frequent handovers. Furthermore, when preemptive handover occurs, the solution may reduce lag and throttling, thus increasing user satisfaction and device performance.

Although the examples and implementations described above include switching transceivers, it should be noted that the methods and systems described herein apply to devices switching between transmitters, receivers, and/or other antenna modules as well.

Figure 5:
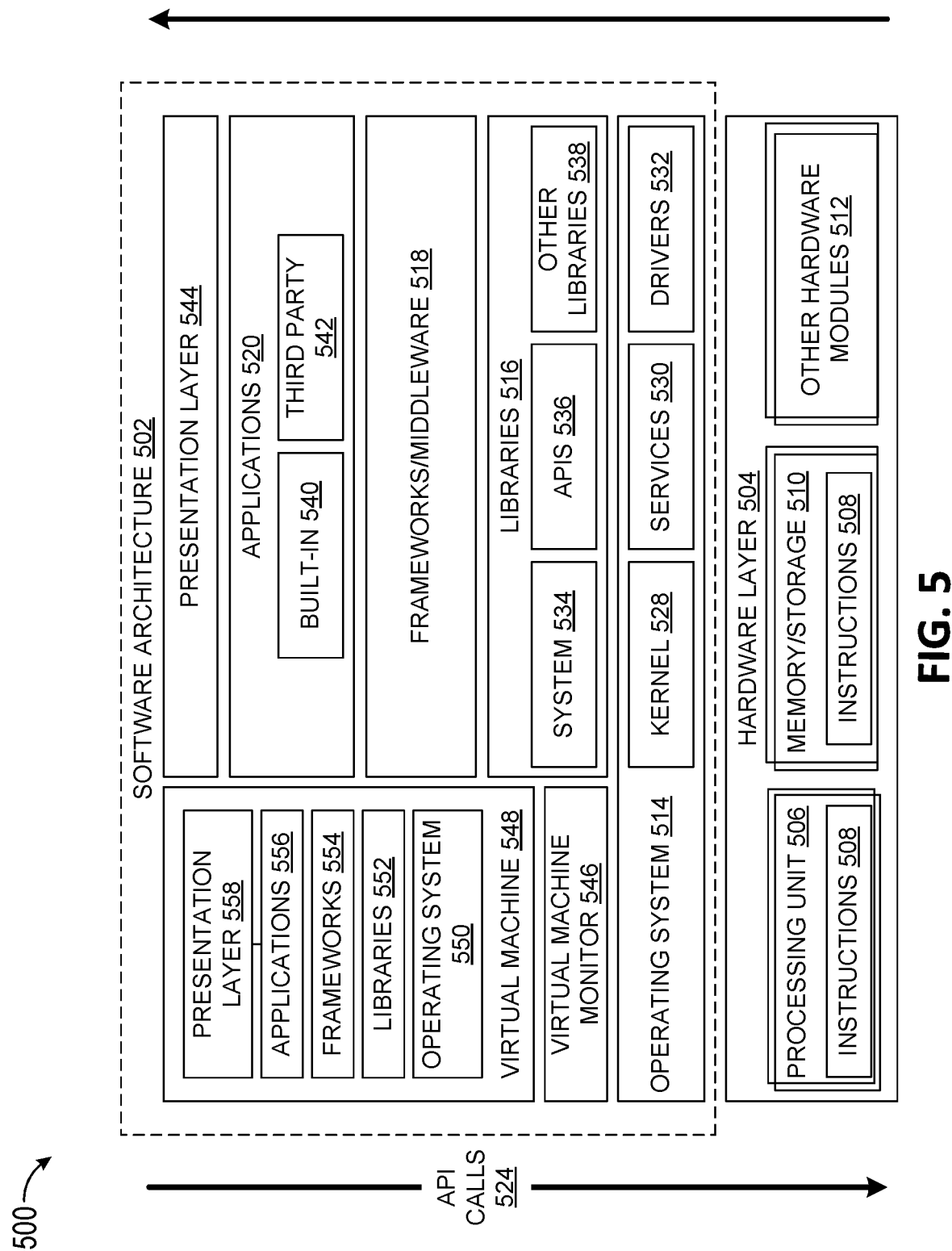
FIG. 5 is a block diagram illustrating an example software architecture, various portions of which may be used in conjunction with various hardware architectures herein described.

FIG. 5 is a block diagram 500 illustrating an example software architecture 502, various portions of which may be used in conjunction with various hardware architectures herein described, which may implement any of the above-described features. FIG. 5 is a non-limiting example of a software architecture and it will be appreciated that many other architectures may be implemented to facilitate the functionality described herein. The software architecture 502 may execute on hardware such as client devices, native application provider, web servers, server clusters, external services, and other servers. A representative hardware layer 504 includes a processing unit 506 and associated executable instructions 508. The executable instructions 508 represent executable instructions of the software architecture 502, including implementation of the methods, modules and so forth described herein.

The hardware layer 504 also includes a memory/storage 510, which also includes the executable instructions 508 and accompanying data. The hardware layer 504 may also include other hardware modules 512. Instructions 508 held by processing unit 508 may be portions of instructions 508 held by the memory/storage 510.

The example software architecture 502 may be conceptualized as layers, each providing various functionality. For example, the software architecture 502 may include layers and components such as an operating system (OS) 514, libraries 516, frameworks 518, applications 520, and a presentation layer 524. Operationally, the applications 520 and/or other components within the layers may invoke API calls 524 to other layers and receive corresponding results 526. The layers illustrated are representative in nature and other software architectures may include additional or different layers. For example, some mobile or special purpose operating systems may not provide the frameworks/middleware 518.

The OS 514 may manage hardware resources and provide common services. The OS 514 may include, for example, a kernel 528, services 530, and drivers 532. The kernel 528 may act as an abstraction layer between the hardware layer 504 and other software layers. For example, the kernel 528 may be responsible for memory management, processor management (for example, scheduling), component management, networking, security settings, and so on. The services 530 may provide other common services for the other software layers. The drivers 532 may be responsible for controlling or interfacing with the underlying hardware layer 504. For instance, the drivers 532 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 516 may provide a common infrastructure that may be used by the applications 520 and/or other components and/or layers. The libraries 516 typically provide functionality for use by other software modules to perform tasks, rather than rather than interacting directly with the OS 514. The libraries 516 may include system libraries 534 (for example, C standard library) that may provide functions such as memory allocation, string manipulation, file operations. In addition, the libraries 516 may include API libraries 536 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 516 may also include a wide variety of other libraries 538 to provide many functions for applications 520 and other software modules.

The frameworks 518 (also sometimes referred to as middleware) provide a higher-level common infrastructure that may be used by the applications 520 and/or other software modules. For example, the frameworks 518 may provide various GUI functions, high-level resource management, or high-level location services. The frameworks 518 may provide a broad spectrum of other APIs for applications 520 and/or other software modules.

The applications 520 include built-in applications 520 and/or third-party applications 522. Examples of built-in applications 520 may include, but are not limited to, a contacts application, a browser application, a location application, a media application, a messaging application, and/or a game application. Third-party applications 522 may include any applications developed by an entity other than the vendor of the particular system. The applications 520 may use functions available via OS 514, libraries 516, frameworks 518, and presentation layer 524 to create user interfaces to interact with users.

Some software architectures use virtual machines, as illustrated by a virtual machine 528. The virtual machine 528 provides an execution environment where applications/modules can execute as if they were executing on a hardware machine (such as the machine 600 of FIG. 6, for example). The virtual machine 528 may be hosted by a host OS (for example, OS 514) or hypervisor, and may have a virtual machine monitor 526 which manages operation of the virtual machine 528 and interoperation with the host operating system. A software architecture, which may be different from software architecture 502 outside of the virtual machine, executes within the virtual machine 528 such as an OS 550, libraries 552, frameworks 554, applications 556, and/or a presentation layer 558.

Figure 6:
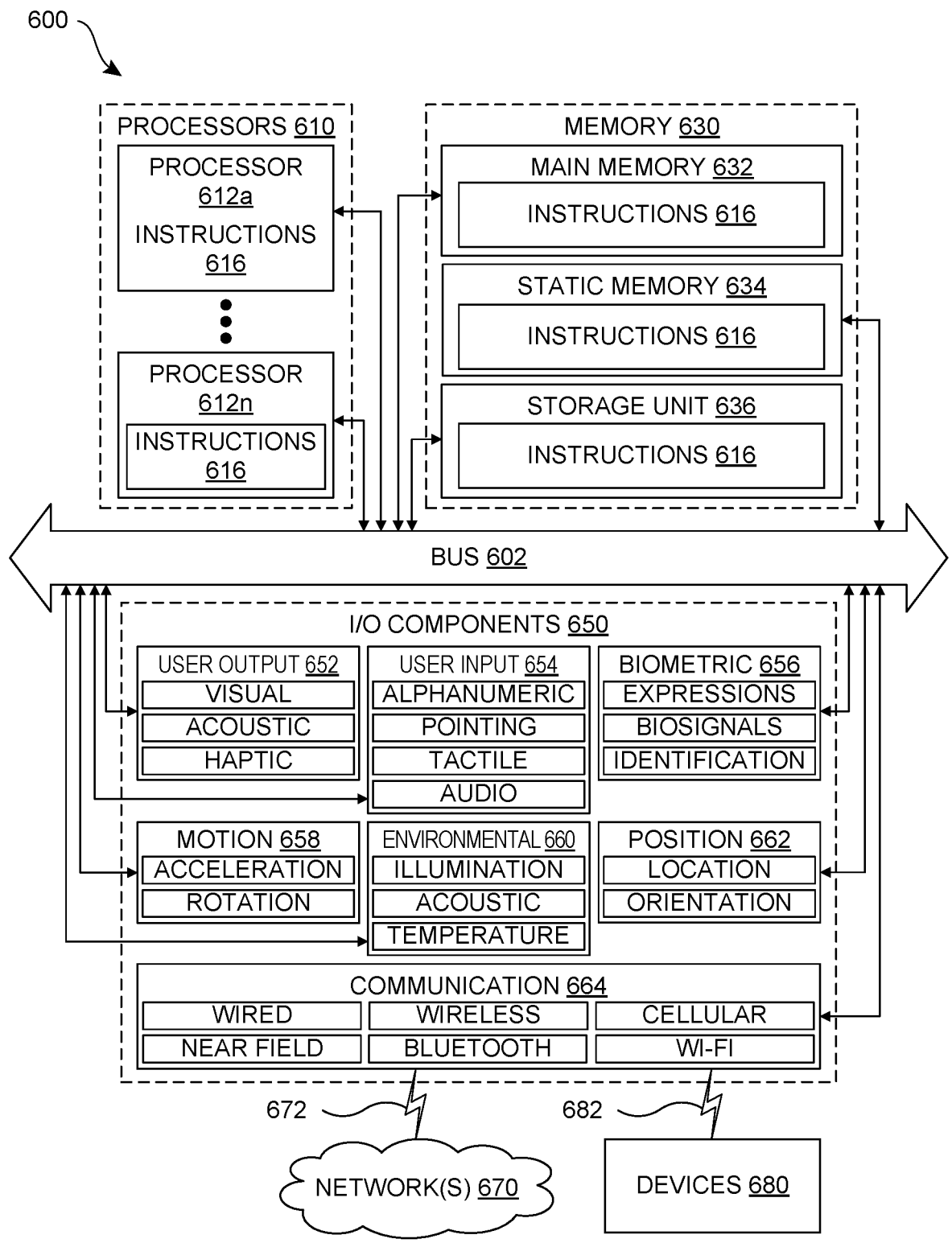
FIG. 6 is a block diagram illustrating components of an example machine configured to read instructions from a machine-readable medium and perform any of the features described herein.

FIG. 6 is a block diagram illustrating components of an example machine 600 configured to read instructions from a machine-readable medium (for example, a machine-readable storage medium) and perform any of the features described herein. The example machine 600 is in a form of a computer system, within which instructions 616 (for example, in the form of software components) for causing the machine 600 to perform any of the features described herein may be executed. As such, the instructions 616 may be used to implement methods or components described herein. The instructions 616 cause unprogrammed and/or unconfigured machine 600 to operate as a particular machine configured to carry out the described features. The machine 600 may be configured to operate as a standalone device or may be coupled (for example, networked) to other machines.

In a networked deployment, the machine 600 may operate in the capacity of a server machine or a client machine in a server-client network environment, or as a node in a peer-to-peer or distributed network environment. Machine 600 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 600 is illustrated, the term "machine" includes a collection of machines that individually or jointly execute the instructions 616.

The machine 600 may include processors 610, memory 630, and I/O components 650, which may be communicatively coupled via, for example, a bus 602. The bus 602 may include multiple buses coupling various elements of machine 600 via various bus technologies and protocols. In an example, the processors 610 (including, for example, a central processing unit (CPU), a graphics processing unit (GPU), a digital signal processor (DSP), an ASIC, or a suitable combination thereof) may include one or more processors 612a to 612n that may execute the instructions 616 and process data. In some examples, one or more processors 610 may execute instructions provided or identified by one or more other processors 610. The term "processor" includes a multi-core processor including cores that may execute instructions contemporaneously. Although FIG. 6 shows multiple processors, the machine 600 may include a single processor with a single core, a single processor with multiple cores (for example, a multi-core processor), multiple processors each with a single core, multiple processors each with multiple cores, or any combination thereof. In some examples, the machine 600 may include multiple processors distributed among multiple machines.

The memory/storage 630 may include a main memory 632, a static memory 634, or other memory, and a storage unit 636, both accessible to the processors 610 such as via the bus 602. The storage unit 636 and memory 632, 634 store instructions 616 embodying any one or more of the functions described herein. The memory/storage 630 may also store temporary, intermediate, and/or long-term data for processors 610. The instructions 616 may also reside, completely or partially, within the memory 632, 634, within the storage unit 636, within at least one of the processors 610 (for example, within a command buffer or cache memory), within memory at least one of I/O components 650, or any suitable combination thereof, during execution thereof. Accordingly, the memory 632, 634, the storage unit 636, memory in processors 610, and memory in I/O components 650 are examples of machine-readable media.

As used herein, "machine-readable medium" refers to a device able to temporarily or permanently store instructions and data that cause machine 600 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 616) for execution by a machine 600 such that the instructions, when executed by one or more processors 610 of the machine 600, cause the machine 600 to perform and one or more of the features described herein. Accordingly, a "machine-readable medium" may refer to a single storage device, as well as "cloud-based" storage systems or storage networks that include multiple storage apparatus or devices.

The I/O components 650 may include a wide variety of hardware components adapted to receive input, provide output, produce output, transmit information, exchange information, capture measurements, and so on. The specific I/O components 650 included in a particular machine will depend on the type and/or function of the machine. For example, mobile devices such as mobile phones may include a touch input device, whereas a headless server or IoT device may not include such a touch input device. The particular examples of I/O components illustrated in FIG. 6 are in no way limiting, and other types of components may be included in machine 600. The grouping of I/O components 650 are merely for simplifying this discussion, and the grouping is in no way limiting. In various examples, the I/O components 650 may include user output components 652 and user input components 654. User output components 652 may include, for example, display components for displaying information (for example, a liquid crystal display (LCD) or a projector), acoustic components (for example, speakers), haptic components (for example, a vibratory motor or force-feedback device), and/or other signal generators. User input components 654 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 650 may include biometric components 656 and/or position components 662, among a wide array of other environmental sensor components. The biometric components 656 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 662 may include, for example, location sensors (for example, a Global Position System (GPS) receiver), altitude sensors (for example, an air pressure sensor from which altitude may be derived), and/or orientation sensors (for example, magnetometers).

The I/O components 650 may include communication components 664, implementing a wide variety of technologies operable to couple the machine 600 to network(s) 670 and/or device(s) 680 via respective communicative couplings 672 and 682. The communication components 664 may include one or more network interface components or other suitable devices to interface with the network(s) 670. The communication components 664 may include, for example, components adapted to provide wired communication, wireless communication, cellular communication, Near Field Communication (NFC), Bluetooth communication, Wi-Fi, and/or communication via other modalities. The device(s) 680 may include other machines or various peripheral devices (for example, coupled via USB).

In some examples, the communication components 664 may detect identifiers or include components adapted to detect identifiers. For example, the communication components 664 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 662, such as, but not limited to, geo-location via Internet Protocol (IP) address, location via Wi-Fi, cellular, NFC, Bluetooth, or other wireless station identification and/or signal triangulation.

While various embodiments have been described, the description is intended to be exemplary, rather than limiting, and it is understood that many more embodiments and implementations are possible that are within the scope of the embodiments. Although many possible combinations of features are shown in the accompanying figures and discussed in this detailed description, many other combinations of the disclosed features are possible. Any feature of any embodiment may be used in combination with or substituted for any other feature or element in any other embodiment unless specifically restricted. Therefore, it will be understood that any of the features shown and/or discussed in the present disclosure may be implemented together in any suitable combination. Accordingly, the embodiments are not to be restricted except in light of the attached claims and their equivalents. Also, various modifications and changes may be made within the scope of the attached claims.

Generally, functions described herein (for example, the features illustrated in FIGS. 1-4) can be implemented using software, firmware, hardware (for example, fixed logic, finite state machines, and/or other circuits), or a combination of these implementations. In the case of a software implementation, program code performs specified tasks when executed on a processor (for example, a CPU or CPUs). The program code can be stored in one or more machine-readable memory devices. The features of the techniques described herein are system-independent, meaning that the techniques may be implemented on a variety of computing systems having a variety of processors. For example, implementations may include an entity (for example, software) that causes hardware to perform operations, e.g., processors functional blocks, and so on. For example, a hardware device may include a machine-readable medium that may be configured to maintain instructions that cause the hardware device, including an operating system executed thereon and associated hardware, to perform operations. Thus, the instructions may function to configure an operating system and associated hardware to perform the operations and thereby configure or otherwise adapt a hardware device to perform functions described above. The instructions may be provided by the machine-readable medium through a variety of different configurations to hardware elements that execute the instructions.

In the following, further features, characteristics and advantages of the invention will be described by means of items:

Item 1. An electronic device comprising:
a processor;
a plurality of transceivers; and
a memory in communication with the processor, the memory comprising executable instructions that, when executed by the processor, cause the electronic device to perform functions of:
while a first transceiver is active, identifying, from among the plurality of transceivers and based on signal quality, current temperature, and cooling capacity of each of the plurality of transceivers, a second transceiver to handover transmission of signal to from the first transceiver; and
handing over transmission of the signal from the first transceiver to the identified second transceiver.

Item 2. The electronic device of item 1, wherein the instructions further cause the processor to cause the electronic device to perform functions of:
determining an amount of time it will take the first transceiver to reach a threshold temperature; and
handing over transmission of the signal from the first transceiver to the identified second transceiver before the amount of time is reached.

Item 3. The electronic device of item 2, wherein determining the amount of time it will take the first transceiver to reach the predetermined temperature comprises:
determining a current temperature of the first transceiver;
determining an amount of power used by the first transceiver;
determining a location of the first transceiver within the electronic device; and
determining a cooling capacity of the first transceiver.

Item 4. The electronic device of item 3, wherein the instructions further cause the processor to cause the electronic device to perform functions of:
inputting at least one of the current temperature of the first transceiver, the amount of power used by the first transceiver, a task the electronic device is being used for, the location of the first transceiver within the electronic device, and the cooling capacity of the first transceiver into a machine-learning 'ML' model; and
obtaining the amount of time it will take the first transceiver to reach the predetermined temperature as an output of the ML model.

Item 5. The electronic device of any one of the preceding items, wherein determining the cooling capacity of each of the plurality of transceivers comprises analyzing a posture of the electronic device.

Item 6. The electronic device of any one of the preceding items, wherein analyzing a posture of the electronic device comprises determining how a user's grip on the electronic device affects the cooling capacity.

Item 7. The electronic device of any one of the preceding items, wherein identifying the second transceiver comprises examining a current task the electronic device is being used for and determining a future task the electronic device is predicted to be used for.

Item 8. The electronic device of any one of the preceding items, wherein identifying the second transceiver comprises calculating a thermal time constant for each of the plurality of transceivers.

Item 9. A method for handing over transmission of a signal from a first transceiver to a second transceiver, from among a plurality of transceivers, in an electronic device, comprising:
while a first transceiver is active, identifying, from among the plurality of transceivers and based on signal quality, current temperature, and cooling capacity of each of the plurality of transceivers, the second transceiver; and handing over transmission of the signal from the first transceiver to the identified second transceiver.

Item 10. The method of item 9, further comprising:
determining an amount of time it will take the first transceiver to reach a threshold temperature; and
handing over transmission of the signal from the first transceiver to the identified second transceiver before the amount of time is reached.

Item 11. The method of item 10, wherein determining the amount of time it will take the first transceiver to reach the predetermined temperature comprises:
determining a current temperature of the first transceiver;
determining an amount of power used by the first transceiver;
determining a location of the first transceiver within the electronic device; and
determining a cooling capacity of the first transceiver.

Item 12. The method of item 11, further comprising:
inputting at least one of the current temperature of the first transceiver, the amount of power used by the first transceiver, a task the electronic device is being used for, the location of the first transceiver within the electronic device, and the cooling capacity of the first transceiver into a machine-learning 'ML' model; and
obtaining the identified one of the plurality of transceivers as an output from the ML model.

Item 13. The method of any one of the preceding items, wherein identifying the second transceiver comprises examining a current task the electronic device is being used for and determining a future task the electronic device is predicted to be used for.

Item 14. The method of any one of the preceding items, wherein determining the cooling capacity of each of the plurality of transceivers comprises analyzing a posture of the electronic device.

Item 15. A computer program that, when executed, causes a programmable device to carry out the method of any one of items 8 to 14.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows, and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein.

Relational terms such as first and second and the like may be used solely to distinguish one entity or action from another without necessarily requiring or implying any actual such relationship or order between such entities or actions. The terms "comprises," "comprising," and any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

The Abstract of the Disclosure is provided to allow the reader to quickly identify the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that any claim requires more features than the claim expressly recites. Rather, as the following claims reflect, inventive subject matter lies in less than all features of a single disclosed example. Thus, the following claims are hereby incorporated into the Detailed Description, with each claim standing on its own as a separately claimed subject matter.

What is claimed is:

1. An electronic device comprising:
a processor;
a plurality of transceivers; and
a memory in communication with the processor, the memory comprising executable instructions that, when executed by the processor, cause the electronic device to perform functions of:
while a first transceiver is active, identifying, from among the plurality of transceivers and based on signal quality, current temperature, and cooling capacity of each of the plurality of transceivers, a second transceiver to handover transmission of signal to from the first transceiver, wherein the cooling capacity comprises factors reducing the current temperature of a particular transceiver;
determining an amount of time it will take the first transceiver to reach a threshold temperature; and
handing over transmission of the signal from the first transceiver to the identified second transceiver before the amount of time is reached.

2. The electronic device of claim 1, wherein determining the amount of time it will take the first transceiver to reach the threshold temperature comprises:

determining a current temperature of the first transceiver;
determining an amount of power used by the first transceiver;
determining a location of the first transceiver within the electronic device; and
determining a cooling capacity of the first transceiver.

3. The electronic device of claim 2, wherein the instructions further cause the processor to cause the electronic device to perform functions of:
inputting at least one of the current temperature of the first transceiver, the amount of power used by the first transceiver, a task the electronic device is being used for, the location of the first transceiver within the electronic device, and the cooling capacity of the first transceiver into a machine-learning 'ML' model; and
obtaining the amount of time it will take the first transceiver to reach the threshold temperature as an output of the ML model.

4. The electronic device of claim 1, wherein determining the cooling capacity of each of the plurality of transceivers comprises analyzing a posture of the electronic device.

5. The electronic device of claim 1, wherein analyzing a posture of the electronic device comprises determining how a user's grip on the electronic device affects the cooling capacity.

6. The electronic device of claim 1, wherein identifying the second transceiver comprises examining a current task the electronic device is being used for and determining a future task the electronic device is predicted to be used for.

7. The electronic device of claim 1, wherein identifying the second transceiver comprises calculating a thermal time constant for each of the plurality of transceivers.

8. A method for handing over transmission of a signal from a first transceiver to a second transceiver, from among a plurality of transceivers, in an electronic device, comprising:
while a first transceiver is active, identifying, from among the plurality of transceivers and based on signal quality, current temperature, and cooling capacity of each of the plurality of transceivers, the second transceiver, wherein the cooling capacity comprises factors reducing the current temperature of a particular transceiver;
determining an amount of time it will take the first transceiver to reach a threshold temperature; and
handing over transmission of the signal from the first transceiver to the identified second transceiver before the amount of time is reached.

9. The method of claim 8, wherein determining the amount of time it will take the first transceiver to reach the threshold temperature comprises:
determining a current temperature of the first transceiver;
determining an amount of power used by the first transceiver;
determining a location of the first transceiver within the electronic device; and
determining a cooling capacity of the first transceiver.

10. The method of claim 9, further comprising:
inputting at least one of the current temperature of the first transceiver, the amount of power used by the first transceiver, a task the electronic device is being used for, the location of the first transceiver within the electronic device, and the cooling capacity of the first transceiver into a machine-learning 'ML' model; and
obtaining identification of the second transceiver from the plurality of transceivers as an output from the ML model.

11. The method of claim 8, wherein identifying the second transceiver comprises examining a current task the electronic device is being used for and determining a future task the electronic device is predicted to be used for.

12. The method of claim 8, wherein determining the cooling capacity of each of the plurality of transceivers comprises analyzing a posture of the electronic device.

13. A non-transitory computer readable medium on which are stored instructions that when executed cause a programmable device to perform functions of:
while a first transceiver is active, identifying a second transceiver, from among a plurality of transceivers in an electronic device, the second transceiver being identified based on signal quality, current temperature, and cooling capacity of each of the plurality of transceivers, wherein the cooling capacity comprises factors reducing the current temperature of a particular transceiver;
determining an amount of time it will take the first transceiver to reach a threshold temperature; and
handing over transmission of the signal from the first transceiver to the identified second transceiver before the amount of time is reached.

14. The non-transitory computer readable medium of claim 13, wherein determining the amount of time it will take the first transceiver to reach the threshold temperature comprises:
determining a current temperature of the first transceiver;
determining an amount of power used by the first transceiver;
determining a location of the first transceiver within the electronic device; and
determining a cooling capacity of the first transceiver.

15. The non-transitory computer readable medium of claim 13, wherein the instructions when executed further cause a programmable device to perform functions of:
inputting at least one of the current temperature of the first transceiver, the amount of power used by the first transceiver, a task the electronic device is being used for, a location of the first transceiver within the electronic device, and the cooling capacity of the first transceiver into a machine-learning 'ML' model; and
obtaining the identified one of the plurality of transceivers as an output from the ML model.

16. The non-transitory computer readable medium of claim 13, wherein identifying the second transceiver comprises examining a current task the electronic device is being used for and determining a future task the electronic device is predicted to be used for.

17. The non-transitory computer readable medium of claim 13, wherein determining the cooling capacity of each of the plurality of transceivers comprises analyzing a posture of the electronic device.

* * * * *